S. Craig,
Spur.
No. 98,235. Patented Dec. 28, 1869.

Witnesses:
Hinchman
Jno V Brooks

Inventor:
S. Craig
Per _____
Attorneys.

United States Patent Office.

SETH CRAIGE, OF PHILADELPHIA, PENNSYLVANIA.

Letters Patent No. 98,235, dated December 28, 1869.

IMPROVED SPUR.

The Schedule referred to in these Letters Patent and making part of the same

*To all whom it may concern:*

Be it known that I, SETH CRAIGE, of Philadelphia, in the county of Philadelphia, and State of Pennsylvania, have invented a new and improved Spur; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
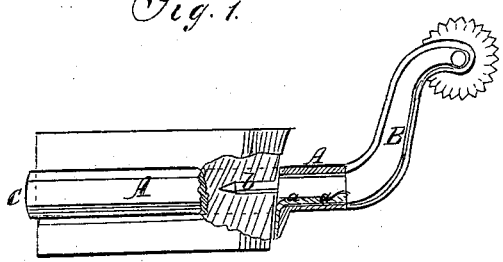
Figure 1 represents a side view, partly in section, of my improved spur.
Figure 2:
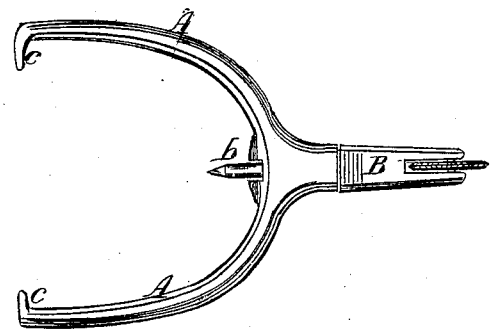
Figure 2 is a plan or top view of the same.

This invention relates to a new manner of securing spurs to the heels, and has for its object to provide a simple and reliable fastening, which need not have any catch provided in the heel, and which allows the ready removal of the spur.

I provide the fork or heel-arms A of a spur with a socket in the middle, and with a spring-catch, $a$, for receiving the shank B.

The shank B carries the pin $b$, which is forced into the heel, and which, together with the inward bent ends $c$ of the fork, serves to retain the spur on the heel.

The spring-catch locks the shank to the fork, and thereby also the spur to the heel. It engages into a rounded or bevelled recess of the shank, as shown, and allows, therefore, the shank to be pulled out without very great exertion. As soon as the shank is drawn out, the fork will no longer be secured to the heel.

The spur can be readily fastened to different boots as long as their heels are nearly of the same size.

I prefer to make that portion of the shank which fits into the socket of the fork, of polygonal form, and to shape the aperture in the fork accordingly, to prevent the shank from turning in the fork.

Having thus described my invention,

I claim as new, and desire to secure by Letters Patent—

The improved spur above described, formed by the combination of a shank, B, spring-catch $a$, and heel-pin $b$, with heel-arms A A, having the bent ends $c$ $c$, each of said parts being constructed and arranged with respect to the others, as shown and described.

SETH CRAIGE.

Witnesses:
WM. CAMPBELL,
EDM. MAAG.